(12) United States Patent
Shi

(10) Patent No.: US 11,169,558 B2
(45) Date of Patent: Nov. 9, 2021

(54) LOGARITHMIC CURRENT-TO-VOLTAGE CONVERSION CIRCUIT HAVING TEMPERATURE COMPENSATION FUNCTION

(71) Applicant: 3PEAK INC., Suzhou (CN)

(72) Inventor: Chuanbo Shi, Suzhou (CN)

(73) Assignee: 3PEAK INC., Suzhou (CN)

( * ) Notice: Subject to any disclaimer, the term of this patent is extended or adjusted under 35 U.S.C. 154(b) by 0 days.

(21) Appl. No.: 16/964,373

(22) PCT Filed: Dec. 9, 2019

(86) PCT No.: PCT/CN2019/124019
§ 371 (c)(1),
(2) Date: Jul. 23, 2020

(87) PCT Pub. No.: WO2020/199641
PCT Pub. Date: Oct. 8, 2020

(65) Prior Publication Data
US 2021/0232170 A1    Jul. 29, 2021

(30) Foreign Application Priority Data

Apr. 4, 2019  (CN) .......................... 201910270075.4

(51) Int. Cl.
G05F 1/56    (2006.01)
G05F 3/26    (2006.01)
G05F 1/567   (2006.01)

(52) U.S. Cl.
CPC .............. G05F 3/267 (2013.01); G05F 1/561 (2013.01); G05F 1/567 (2013.01)

(58) Field of Classification Search
CPC . G05F 1/56; G05F 1/561; G05F 1/567; G05F 1/46; G05F 1/462; G05F 3/22;
(Continued)

(56) References Cited

U.S. PATENT DOCUMENTS 5,081,378 A * 1/1992 Watanabe ................. G06G 7/24
                                                        327/350
5,534,813 A * 7/1996 DeMicheli ............... G06G 7/24
                                                        327/346
(Continued)

FOREIGN PATENT DOCUMENTS

CN    102323847 A    1/2012
CN    102931925      2/2013
(Continued)

OTHER PUBLICATIONS

Ming Gu; Shantanu Chakrabartty; "Design of a Programmable Gain, Temperature Compensated Current-Input Current-Output CMOS Logarithmic Amplifier"; Aug. 16, 2013; IEEE; pp. 423-431 (Year: 2013).*

(Continued)

Primary Examiner — Thienvu V Tran
Assistant Examiner — Shahzeb K Ahmad
(74) Attorney, Agent, or Firm — Woodard, Emhardt, Henry, Reeves & Wagner, LLP

(57) ABSTRACT

Provided is a logarithmic current-to-voltage conversion circuit having a temperature compensation function. The circuit includes a logarithmic current-to-voltage conversion buffer unit, a positive temperature coefficient compensation unit and a self-heating unit. The logarithmic current-to-voltage conversion buffer unit is provided with a reference circuit consistent with a basic logarithmic circuit. A temperature coefficient is reflected by a difference value ΔVbe between an output of the basic logarithmic circuit and an output of the reference circuit. The positive temperature coefficient compensation unit is provided with a voltage-to-current conversion circuit at a first stage and a current mirror at a second stage and outputs a voltage Vout through an resistor R2. The positive temperature coefficient compensation unit is connected to ΔVbe. The voltage-to-current
(Continued)

conversion circuit is provided with a resistor R0 and an adjustable resistor R1 connected in series, where a temperature coefficient of (R1+R0)/R2 is corrected by adjusting a value of the adjustable resistor R1.

7 Claims, 1 Drawing Sheet

(58) Field of Classification Search
CPC ... G05F 3/222; G05F 3/242; H03K 19/00369; H03K 19/017518
See application file for complete search history.

(56) References Cited

U.S. PATENT DOCUMENTS 7,310,656 B1 * 12/2007 Gilbert ............... G06G 7/24
 708/851

2009/0002056 A1 * 1/2009 Doyle ............... G01R 1/203
 327/512

FOREIGN PATENT DOCUMENTS

| CN | 203872158 | | 10/2014 |
| CN | 108121390 | | 6/2018 |
| CN | 109560809 A | * | 4/2019 |
| CN | 109992898 | | 7/2019 |

OTHER PUBLICATIONS

Maxim Integrated; "Dallas Semiconductor Engineering Journal Volume Fifty-Six"; Nov. 2005; Maxim Integrated; vol. 56; pp. 4-6 (Year: 2005).*

International Search Report of PCT/CN2019/124019 dated Mar. 10, 2020.

* cited by examiner

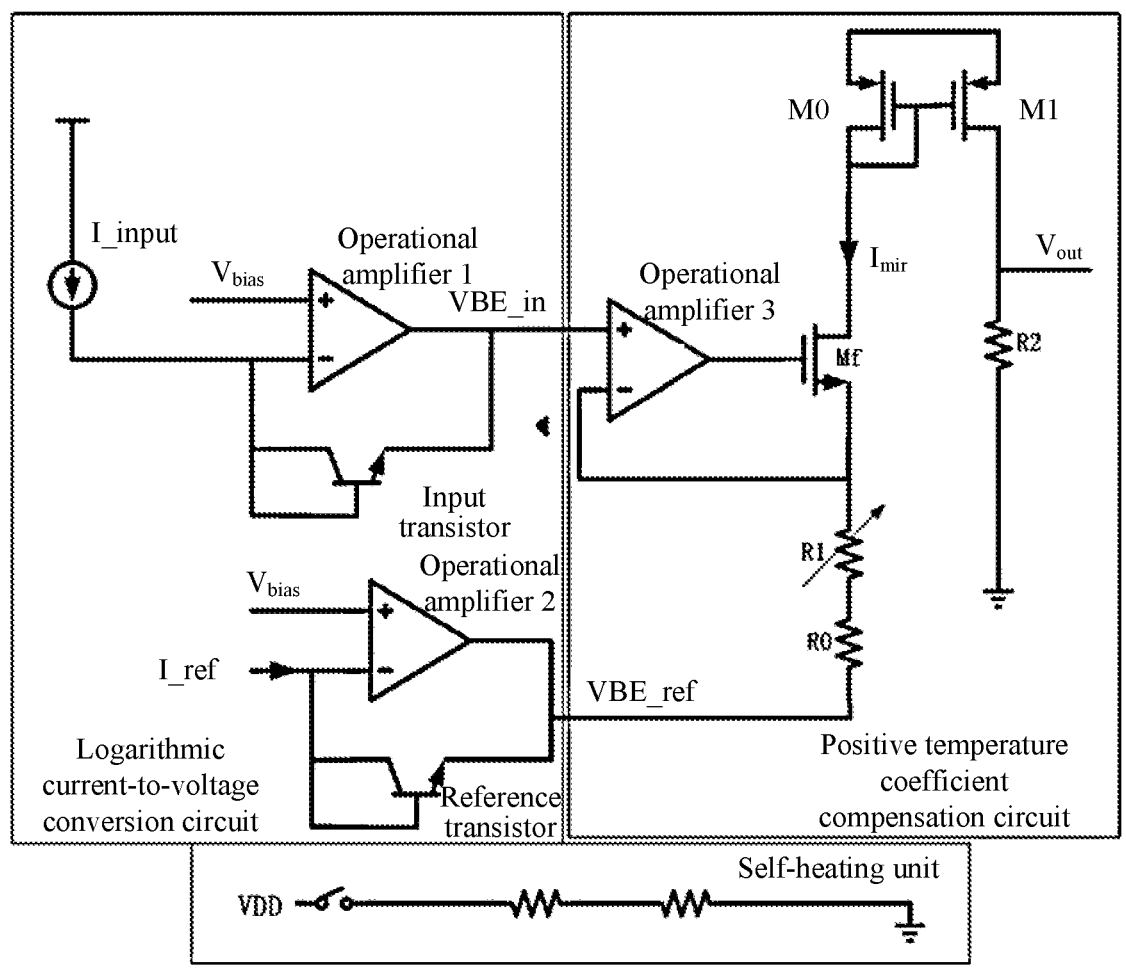

LOGARITHMIC CURRENT-TO-VOLTAGE CONVERSION CIRCUIT HAVING TEMPERATURE COMPENSATION FUNCTION

CROSS-REFERENCES TO RELATED APPLICATIONS

This is a National Stage Application, filed under 35 U.S.C. 371, of International Patent Application No. PCT/CN2019/124019, filed on Dec. 9, 2019, which claims the priority of a Chinese patent application No. 201910270075.4 filed at the CNIPA on Apr. 4, 2019, disclosure of which is incorporated herein by reference in its entirety.

TECHNICAL FIELD

The present application relates to a circuit design having a temperature compensation function achieved by means of an integrated circuit and, for example, to a logarithmic current-to-voltage conversion circuit having a temperature compensation function.

BACKGROUND

As the electronic application technology advances by leaps and bounds, hardware infrastructure follows the trend. In this trend, microelectronics keeps breaking through and growing by overcoming constantly emerging technical problems. In the microelectronic design of various application systems, especially on the basis of photoelectric conversion hardware developed in the field of communications, a converted current signal inputted to a microelectronic system usually has a wide dynamic range. Nevertheless, for the purpose of operations by the system, it is needed to convert the current signal into a voltage signal. In most of the conventional solutions, an architecture formed by an operational amplifier and a bipolar junction transistor (BJT) is used to implement a logarithmic signal conversion from current (I) to voltage (V). However, an electronic component in a logarithmic current-to-voltage conversion circuit usually has various ranges of temperature coefficients under different process conditions. This has a great impact on the performance of circuit products. Particularly, the stability of the logarithmic-converted signal varies with the temperature, and the thus the stability of the signal is poor.

Generally, temperature compensation for such circuits can be improved only by using an off-chip system. In this manner, relatively accurate logarithmic features of input and output can be achieved, but undoubtedly the system is more complex and monolithic integration cannot be achieved, thus limiting the application of logarithmic circuits.

SUMMARY

The present application provides a logarithmic current-to-voltage conversion circuit having a temperature compensation function to solve the problem of a temperature adaptation stability of a logarithmic signal conversion device.

The logarithmic current-to-voltage conversion circuit having a temperature compensation function provided by the present application includes a logarithmic current-to-voltage conversion buffer unit, a positive temperature coefficient compensation unit and a self-heating unit.

The logarithmic current-to-voltage conversion buffer unit is provided with a reference circuit consistent with a basic logarithmic circuit. A temperature coefficient is reflected by a difference value $\Delta Vbe$ between an output of the basic logarithmic circuit and an output of the reference circuit.

The positive temperature coefficient compensation unit is provided with a voltage-to-current conversion circuit at a first stage and a current mirror at a second stage, and the positive temperature coefficient compensation unit outputs a voltage Vout through an external resistor R2. An input of the positive temperature coefficient compensation unit is connected to $\Delta Vbe$. The voltage-to-current conversion circuit is provided with a resistor R0 and an adjustable resistor R1 connected in series, where a temperature coefficient of (R1+R0)/R2 is corrected by adjusting a value of the adjustable resistor R1.

The basic logarithmic circuit includes a first operational amplifier and an input bipolar junction transistor (BJT). A positive input terminal of the first operational amplifier is connected to a fixed bias Vbias. A base and a collector of the input BJT are in a short connection and connected, together with an input current I_input, to a negative input terminal of the first operational amplifier. An emitter of the input BJT is connected to an output terminal of the first operational amplifier.

The reference circuit is composed of a second operational amplifier and a reference BJT. A positive input terminal of the second operational amplifier is connected to the fixed bias Vbias. The reference BJT and an input BJT of the basic logarithmic circuit are configured in a consistent manner and have a same connection manner. A reference current I_ref is connected to a negative input terminal of the second operational amplifier.

The voltage-to-current conversion circuit is composed of a third operational amplifier, an NMOS transistor Mf, a resistor R0 and an adjustable resistor R1. A positive input terminal of the third operational amplifier is connected to the output of the basic logarithmic circuit. A negative input terminal of the third operational amplifier is connected to a source of the NMOS transistor Mf and is connected in series to the output of the reference circuit through two resistors. An output terminal of the third operational amplifier is connected to a gate of the NMOS transistor Mf.

The current mirror is composed of a PMOS transistor M0 and a PMOS transistor M1, where the PMOS transistor M0 and the PMOS transistor M1 have a connected common source. A common gate of the PMOS transistor M0 and the PMOS transistor M1 and a drain of the PMOS transistor M0 are together connected to a drain of the NMOS transistor Mf in the voltage-to-current conversion circuit. A drain of the PMOS transistor M1 is connected in series to ground through the resistor R2 and outputs the voltage Vout.

An adjustment range of the adjustable resistor R1 is adapted to deviations of the resistor R0 and the resistor R2 during manufacture, that is, ensuring to correct the temperature coefficient of (R1+R0)/R2 as required when resistance values of the two resistors deviate during manufacture.

The self-heating unit is integrated at a bottom of the logarithmic current-to-voltage conversion circuit. The self-heating unit includes a switch connected to a power supply VDD and a heating resistance wire.

The logarithmic current-to-voltage conversion circuit having a temperature compensation function provided in the present application can achieve a temperature compensation in-chip completely so that a system with the circuit can be integrated in one chip, and a simulation result of the circuit shows that the output is more stable along with temperature variations.

BRIEF DESCRIPTION OF DRAWINGS

FIG. 1 is a schematic structural diagram of a logarithmic current-to-voltage conversion circuit according to the present application.

DETAILED DESCRIPTION

A specific embodiment of the present application is further described in conjunction with the drawings to better understand and master the technical solution of the present application and thus more clearly define the protection scope of the present application.

As regards the shortcomings of a traditional structure of a logarithmic current-to-voltage conversion circuit in the related art, the present application aims at overall optimizing the performance of the circuit, so that the device may adapt to temperature variations under an operating environment and a signal conversion can be efficiently and stably achieved.

For a more concrete understanding, FIG. 1 is a schematic structural diagram of a logarithmic current-to-voltage conversion circuit according to an embodiment of the present application. The logarithmic current-to-voltage conversion circuit mainly includes a logarithmic current-to-voltage conversion buffer unit, a positive temperature coefficient compensation unit and a self-heating unit. The circuits of the three unit are connected and matched in different ways to implement a temperature compensation in-chip. The technical summary of the various parts is that the logarithmic current-to-voltage conversion buffer unit is provided with a reference circuit consistent with a basic logarithmic circuit, and a temperature coefficient is reflected by a difference value ΔVbe between an output of the basic logarithmic circuit and an output of the reference circuit, so as to track the degree to which the output of the basic logarithmic circuit is affected by temperature variations. The positive temperature coefficient compensation unit is provided with a voltage-to-current conversion circuit at a first stage and a current mirror at a second stage and outputs a voltage Vout through an external resistor R2, an input of the positive temperature coefficient compensation unit is connected to ΔVbe, and the voltage-to-current conversion circuit is provided with a resistor R0 and an adjustable resistor R1 connected in series, where the value of the adjustable resistor R1 is adjusted to compensate the temperature coefficient of the basic logarithmic circuit. An adjustment range of the adjustable resistor R1 is adapted to deviations of the resistor R0 and the resistor R2 during manufacture, that is, ensuring to correct the temperature coefficient of (R1+R0)/R2 as required when resistance values of the two resistors deviate during manufacture. For example, the resistor R0 and the resistor R2 are usually made of the same material and have resistance values varying simultaneously. Assuming that the resistor R0 is 10 k ohms and the actual resistance value is as low as 8 k ohms due to a process deviation during manufacture, the adjustment range of the resistor R1 needs to ensure that the temperature coefficient of (R1+R0)/R2 can be adjusted to a required temperature coefficient even if the resistance R0 is changed to be 8 k ohms due to the process deviation. Similarly, if the actual resistance value is as high as 13 k ohms due to a process deviation during manufacture, then the adjustment range of the resistor R1 needs to ensure that the temperature coefficient of (R1+R0)/R2 can be adjusted to a required temperature coefficient even if the resistor R0 is changed to be 13 k ohms due to the process deviation. The adjustment range and an adjustment accuracy of the resistor R1 is to be calculated according to maximum deviation ranges of the resistor R0 and the resistor R2 to meet the requirements.

In view of a further detailed feature, the basic logarithmic circuit is composed of a first operational amplifier and an input BJT. A positive input terminal of the first operational amplifier is connected to a fixed bias Vbias. A base and a collector of the input BJT are in a short connection and connected, together with an input current I_input, to a negative input terminal of the first operational amplifier. An emitter of the input BJT is connected to an output terminal of the first operational amplifier and serves as the output VBE_in of the basic logarithmic circuit.

Furthermore, the reference circuit is composed of a second operational amplifier and a reference BJT. A positive input terminal of the second operational amplifier is connected to the fixed bias Vbias consistent with the positive input terminal of the first operational amplifier. The reference BJT and the input BJT of the basic logarithmic circuit are configured in a consistent manner and have a same connection manner. That is, a base and a collector of the reference BJT are in the short connection and connected, together with a reference current I_ref, to a negative input terminal of the second operational amplifier. An emitter of the reference BJT is connected to an output terminal of the second operational amplifier and serves as the output VBE_ref of the reference circuit.

The first stage of the positive temperature coefficient compensation unit is the current-to-voltage conversion circuit. The voltage-to-current conversion circuit is composed of a third operational amplifier, an NMOS transistor Mf, a resistor R0 and an adjustable resistor R1, and mainly configured to transmit a current to a next stage and endow the next stage adjustability. A positive input terminal of the third operational amplifier is connected to the output VBE_in of the basic logarithmic circuit. A negative input terminal of the third operational amplifier is connected to a source of the NMOS transistor Mf and is connected in series to the output VBE_ref of the reference circuit through two resistors. An output terminal of the third operational amplifier is connected to a gate of the NMOS transistor Mf.

The current mirror is composed of a PMOS transistor M0 and a PMOS transistor M1 with, and the PMOS transistor M0 and the PMOS transistor M1 have a connected common source. A common gate of the PMOS transistor M0 and the PMOS transistor M1 and a drain of the PMOS transistor M0 are together connected to a drain of the NMOS transistor Mf in the voltage-to-current conversion circuit. A drain of the PMOS transistor M1 is connected in series to ground through the resistor R2 and outputs the voltage Vout.

Through a theoretically analysis in conjunction with the circuit structure illustrated and described above, in view of the outputs of the logarithmic current-to-voltage conversion buffer unit, the difference value ΔVbe=VBE_in−VBE_ref=A*KT*ln(I_in/I_ref), where A denotes a circuit fixed parameter, K denotes a bauzmann constant, and T denotes a real-time temperature. From the formula, ΔVbe has a positive temperature coefficient, and thus, it is necessary to compensate the temperature coefficient of ΔVbe. The right part of FIG. 1 is the positive temperature coefficient compensation unit. An input of the positive temperature coefficient compensation unit is ΔVbe. After the V2I circuit at the first stage, a current output of the V2I circuit Imir=ΔVbe/(R1+R0). Then, after the current mirror composed of the PMOS transistor M0 and the PMOS transistor M1, the output voltage Vout is formed on the resistor R2. Assuming that a mirror image coefficient is 1, the output voltage Vout=Imir*R2. According to the formula, Vout=ΔVbe*R2/(R1+R0)=A*KT*ln(I_in/I_ref)*R2/(R1+R0).

According to the preceding formula, it is feasible to design a temperature coefficient of KT and the temperature coefficient of (R1+R0)/R2 in a consistent manner to achieve a temperature compensation of a logarithmic current-to-voltage conversion. Therefore, the resistor R2 and the resistor R0 are configured to have a consistent temperature coefficient, (R1+R0)/R2 is configured to have a positive temperature coefficient (the R1 has a positive temperature coefficient relative to the R0 and the R2), and the temperature coefficient may be adjusted through the value of the resistor R1, so that the temperature compensation under different process conditions is achieved. Although an adjustment to the resistor R1 results in a deviation in the absolute value of Vout, the absolute value may be corrected through an adjustment to the mirror image coefficient or in other proportional manners.

Additionally, as shown in FIG. 1, the self-heating unit is integrated at a bottom of the logarithmic current-to-voltage conversion circuit, and the self-heating unit is composed of a switch connected to a power supply VDD and a heating resistance wire. The temperature of the whole circuit is changed rapidly in response to temperature compensation requirements through the switch, so that a temperature calibration can be implemented without external temperature variations or off-chip components.

In summary, with reference to the detailed description of the illustrated embodiment, the circuit structure design of the present application has prominent substantive features and significant advancement. The logarithmic current-to-voltage conversion circuit implements the temperature compensation in-chip completely, so that a system with the circuit can be integrated in one chip, and a simulation result of the circuit shows that the output is more stable along with temperature variations. Moreover, the whole calibration circuit has a simple structure with lower costs, and has a lower requirement on calibration devices or ATE machines.

What is claimed is:

1. A logarithmic current-to-voltage conversion circuit having a temperature compensation function, comprising: a logarithmic current-to-voltage conversion buffer unit, a positive temperature coefficient compensation unit and a self-heating unit, wherein
the logarithmic current-to-voltage conversion buffer unit is provided with a reference circuit consistent with a basic logarithmic circuit, and a temperature coefficient is reflected by a difference value ΔVbe between an output of the basic logarithmic circuit and an output of the reference circuit; and
the positive temperature coefficient compensation unit is provided with a voltage-to-current conversion circuit at a first stage and a current mirror at a second stage, and the positive temperature coefficient compensation unit outputs a voltage Vout through an external resistor R2, an input of the positive temperature coefficient compensation unit is connected to ΔVbe, and the voltage-to-current conversion circuit is provided with a resistor R0 and an adjustable resistor R1 connected in series, wherein a temperature coefficient of (R1+R0)/R2 is corrected by adjusting a value of the adjustable resistor R1.

2. The logarithmic current-to-voltage conversion circuit having a temperature compensation function according to claim 1, wherein the basic logarithmic circuit comprises a first operational amplifier and an input bipolar junction transistor (BJT), wherein a positive input terminal of the first operational amplifier is connected to a fixed bias Vbias, a base and a collector of the input BJT are in a short connection and connected, together with an input current I_input, to a negative input terminal of the first operational amplifier, and an emitter of the input BJT is connected to an output terminal of the first operational amplifier.

3. The logarithmic current-to-voltage conversion circuit having a temperature compensation function according to claim 1, wherein the reference circuit comprises a second operational amplifier and a reference BJT, wherein a positive input terminal of the second operational amplifier is connected to a fixed bias Vbias, the reference BJT and an input BJT of the basic logarithmic circuit are configured in a consistent manner and have a same connection manner, and a reference current I_ref is connected to a negative input terminal of the second operational amplifier.

4. The logarithmic current-to-voltage conversion circuit having a temperature compensation function according to claim 1, wherein the voltage-to-current conversion circuit comprises a third operational amplifier, an NMOS transistor Mf, a resistor R0 and an adjustable resistor R1, wherein a positive input terminal of the third operational amplifier is connected to the output of the basic logarithmic circuit, a negative input terminal of the third operational amplifier is connected to a source of the NMOS transistor Mf and is connected in series to the output of the reference circuit through two resistors, and an output terminal of the third operational amplifier is connected to a gate of the NMOS transistor Mf.

5. The logarithmic current-to-voltage conversion circuit having a temperature compensation function according to claim 1, wherein the current mirror comprises a PMOS transistor M0 and a PMOS transistor M1, wherein the PMOS transistor M0 and the PMOS transistor M1 have a connected common source, a common gate of the PMOS transistor M0 and the PMOS transistor M1 and a drain of the PMOS transistor M0 are together connected to a drain of an NMOS transistor Mf in the voltage-to-current conversion circuit, and a drain of the PMOS transistor M1 is connected in series to ground through the resistor R2 and outputs the voltage Vout.

6. The logarithmic current-to-voltage conversion circuit having a temperature compensation function according to claim 1, wherein an adjustment range of the adjustable resistor R1 is adapted to deviations of the resistor R0 and the resistor R2 during manufacture.

7. The logarithmic current-to-voltage conversion circuit having a temperature compensation function according to claim 1, wherein the self-heating unit is integrated at a bottom of the logarithmic current-to-voltage conversion circuit, and the self-heating unit comprises a switch connected to a power supply VDD and a heating resistance wire.

* * * * *